United States Patent [19]

Miles et al.

[11] Patent Number: 5,247,761
[45] Date of Patent: Sep. 28, 1993

[54] COMPUTER CONTROLLED SEEDLING TRANSFER APPARATUS

[75] Inventors: Gaines E. Miles, West Lafayette; Stephen M. Beam, Lafayette, both of Ind.

[73] Assignee: Robotic Solutions, Inc., W. Lafayette, Ind.

[21] Appl. No.: 637,180

[22] Filed: Jan. 3, 1991

[51] Int. Cl.$^5$ ............................................. A01G 23/02
[52] U.S. Cl. ................................... 47/1.01; 111/104; 47/901
[58] Field of Search ................. 47/901, 1.01; 111/104, 111/105

[56] References Cited

U.S. PATENT DOCUMENTS

| 3,012,370 | 12/1961 | Lortz | 47/901 |
|---|---|---|---|
| 4,408,549 | 10/1983 | Quarnström | 47/901 |
| 4,947,579 | 4/1990 | Harrison | 47/901 |
| 4,970,824 | 11/1990 | Visser | 47/901 |
| 5,048,434 | 9/1991 | Forster | 111/104 |
| 5,054,831 | 10/1991 | Ting | 111/104 |
| 5,068,999 | 12/1991 | Visser | 47/901 |

*Primary Examiner*—Henry E. Raduazo
*Attorney, Agent, or Firm*—Woodard, Emhardt, Naughton, Moriarty & McNett

[57] ABSTRACT

A computer controlled seedling transfer apparatus includes a pair of free-wheeling conveyors for supporting a commercial grower's seed flat and pot flat. Each conveyor includes an associated indexing mechanism for gripping the respective flat and translating the flat along the conveyor so that certain of the flat recesses are aligned with a transfer station between the flats. A seedling transfer mechanism is supported above the conveyors so that the mechanism can be moved transversely between the seed flat and pot flat. The seedling transfer mechanism includes extendable gripping fingers for gripping a seedling, removing it from the seed flat, transferring it to a specific pot flat recess and replanting the seedling. The indexing mechanisms for the two flats are computer controlled, as is the seedling transfer mechanism, to optimize the seedling transfer operation and to ensure that the pot flat is completely filled with seedlings. In one embodiment, a sensor, such as a camera or an infrared sensor, are mounted over the seed flat and pot flat to sense the condition of the recesses in the flats. The computer responds to the sensed conditions of the recesses to control the sequence of transfer moves, for example to avoid attempted transfers from empty seed flat recesses. A nozzle is provided in another embodiment that is associated with the seedling transfer mechanism that is used to facilitate removal, transfer and replanting of the seedling. The seedling transfer mechanism includes a pair of resilient gripping fingers with a flexible web extending therebetween. The web slightly bends the seedling during the transfer so that the seedling does not get tangled with the transfer mechanism.

10 Claims, 5 Drawing Sheets

COMPUTER CONTROLLED SEEDLING TRANSFER APPARATUS

BACKGROUND OF THE INVENTION

The present invention relates to a computerized transfer apparatus. In particular, the invention concerns an apparatus for transferring plant seedlings between seedling growing trays.

In commercial green houses, plants are typically grown in what is called a seed flat which is essentially a tray having a number of small cavities containing a plug of soil. The seed flat is seeded with a particular plant which is tended until the seedling has grown large enough for commercial sale. At that point, the seedling is ready to be transferred to a pot flat which is generally provided to commercial outlets. Typically, the pot flat will have fewer recesses than the seed flat but each recess will have a larger volume to hold more soil and accommodate a larger root ball as the seedling continues to grow. The smaller recesses in the seed flat save grower's space and reduces watering requirements over the pot flat. However, commercial considerations dictate that the seedling be transferred to a pot flat.

A typical seed flat might measure 14 recesses across and 29 recesses along its length so that up to 406 seedlings can be grown in a single seed flat. A typical pot flat, on the other hand, may have only 4 recesses across its width and 12 recesses along its length, for a total of 48 recesses to receive seedlings transplanted from the seed flat. The transfer of seedlings from the seed flat to the pot flat has presented a unique problem to the industry. It is important that the transfer occur with minimal disturbance to the plant seedling and its root ball. Moreover, since the pot flat is often sold directly to the final consumer, the pot flat must be completely filled with seedlings. In prior transfer apparatus, errors in the seed flat are generally propagated to the pot flat. These errors may include an empty recess in the seed flat or a badly oriented seedling. On the other hand, the need for higher transfer rates has tended to restrict the ability of prior devices to check for and correct these errors. Prior apparatus have been forced to sacrifice speed for efficiency, or vice versa.

There is a need in the art for a seedling transfer apparatus that minimizes the disturbance to the plant seedling, increases the transfer rate between the seed flat and the pot flat, and improves the efficiency of these transfers. There is also a need for such an apparatus that is fully automatic so that only minimal human interaction is required in the transfer operation.

SUMMARY OF THE INVENTION

The present invention resides in an apparatus for sequentially transferring plant seedlings from a seed flat, having a number of plug recesses initially containing a number of plant seedlings therein, to a pot flat, having a number of receiver recesses to be filled with seedlings. Separate conveyors are provided for supporting the seed flat and the pot flat to permit movement of the flats along longitudinal axes. A seedling gripper includes resilient fingers for releasably gripping the seedling to remove the seedling from a plug recess of the seed flat and to release the seedling in a receiver recess of the pot flat. A seedling transfer mechanism moves the seedling gripper between the seed flat and the pot flat along a transfer axis that intersects, and is preferably perpendicular to, the longitudinal axes. Flat gripping and moving mechanisms are provided for indexing the seed and pot flats on their respective conveyors to sequential recesses. A computer controller controls the motion of the flat moving mechanisms so that the plug recesses are sequentially oriented along said transfer axis. A sensor is provided to determine whether a plug was successfully transplanted. If the transplant was not successful, the computer instructs the transferring apparatus to repeat the planting step into a particular pot recess until there is a successful transplant. The computer controller directs the movement of the flat moving mechanisms and seedling transfer mechanism to minimize the travel distance of the seedling during a transfer.

In another aspect of the invention, the seedling gripper includes a flexible web spanning between the fingers and forming a web pocket between the fingers and web. When the fingers grip a seedling, the stem and flower of the seedling is slightly bent by the web so that the seedling does not hang up on the fingers when the seedling is released in the pot flat receiver recess. A water jet is provided as another feature of the invention to facilitate removal and replanting of the seedling, and in another embodiment a water jet is provided to dibble the soil in the receiver recess.

In one embodiment of the seedling transfer mechanism, the fingers are permitted to move only along one horizontal degree of freedom along the transfer axis. The computer controller prescribes a transfer move sequence in which the fingers grab and remove a seedling from a plug recess, and transfer the seedling and replant it in the next sequential receiver recess in the pot flat. After the seedling has been replanted, the fingers are moved away from the seedling until the seedling clear the web pocket, and the pot flat indexed to provide clearance for the fingers to return to the seed flat without contacting any replanted seedlings in the pot flat.

In another embodiment of the seedling transfer mechanism, a rotary motor is provided to rotate the gripper fingers to change the orientation of the web pocket. During the transverse move between the seed and pot flats, the fingers are rotated so that the web pocket faces the destination flat. The transfer move sequence for this rotary version does not require special indexing of the pot flat to clear the gripper fingers and web.

In the preferred embodiment of the invention, the transfer move sequence provides for minimizing the travel distance of the seedling during transfer, while preventing the gripper fingers from disrupting seedlings in the seed flat or pot flat. Thus, the seedlings are removed from the seed flat along longitudinal columns, and they are replanted in the pot flat along transverse rows.

It is one object of the invention to provide a seedling transfer apparatus that is less traumatic to seedlings during the transfer than other prior art devices. Another object is to provide such an apparatus that is capable of high transfer speeds at virtual 100% efficiency.

A further object is to provide a transfer apparatus that does not propagate errors in the seed flat onto the pot flat. Yet another object is to supply an apparatus that can detect whether a transfer was successful and direct future transfer move sequences accordingly. Other objects, as well as the benefits, of the present invention can be readily discerned from the following written description and accompanying figures.

DESCRIPTION OF THE PREFERRED EMBODIMENT

Figure 1:
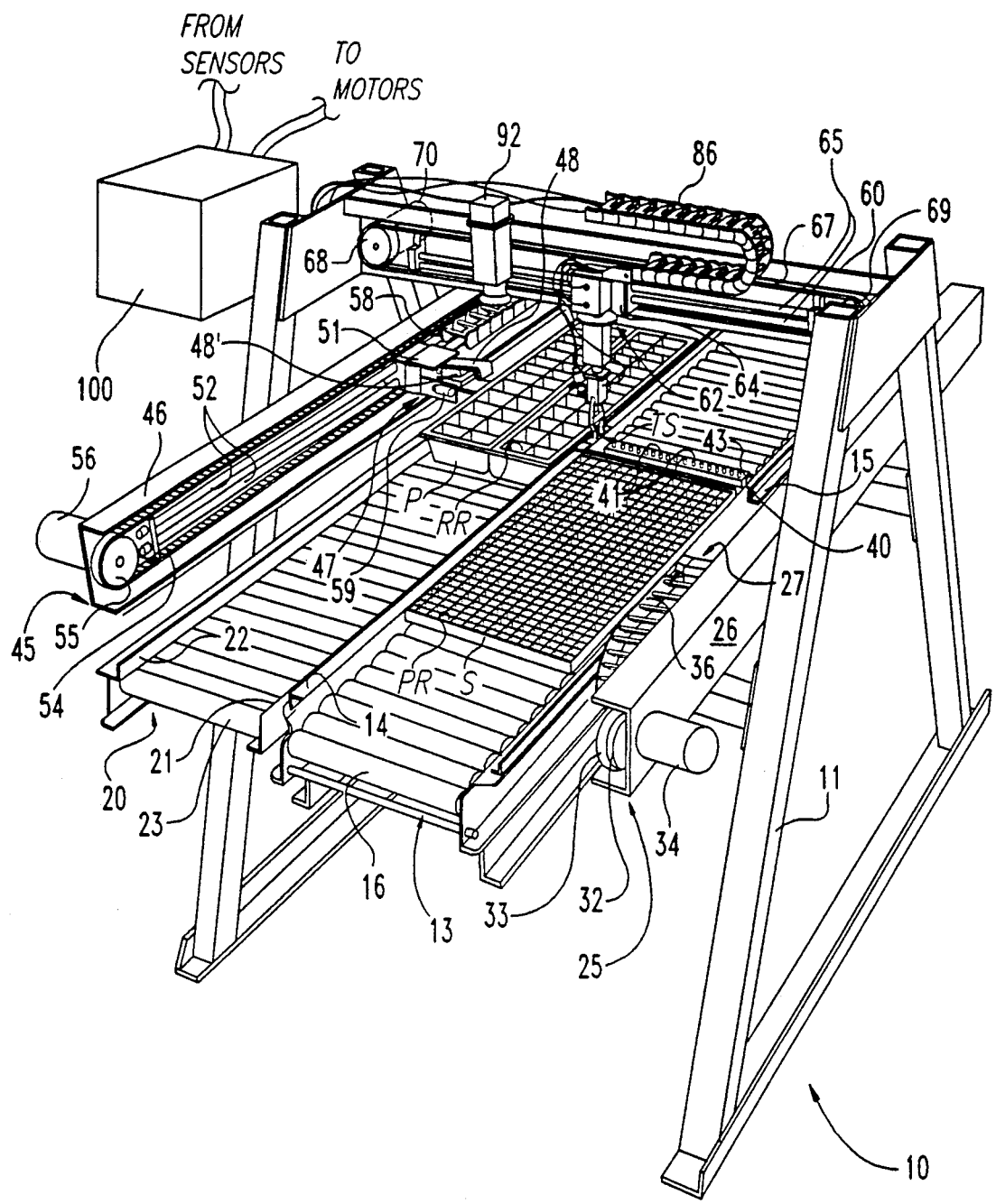
FIG. 1 is an orthographic view of the seedling transfer apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the computer controlled seedling transfer apparatus 10 of the present invention is shown in FIG. 1. The apparatus includes a frame 11 which comprises a number of beam elements to provide lateral and horizontal support for the apparatus. A seed conveyor 13 and pot conveyor 20 are supported by the frame 11. The seed conveyor 13 includes opposite side rails 14 and 15 which rotatably support a number of freewheeling rollers 16. The pot conveyor 20 also includes opposite side rails 21 and 22 supporting freewheeling rollers 23. The seed conveyor 13 and pot conveyor 20 can be of conventional construction for non-driven conveyors. In one specific embodiment, the conveyors can be obtained from Roach Inc. as product no. 138A-12-1½-60. As shown in FIG. 1, a seed flat designated as S is supported by the seed conveyor while a pot flat P sits upon the pot conveyor. Both flats are free to translate along the respective conveyors, since the rollers 16 and 23 are freewheeling. The relative heights of the seed and pot conveyors can be adjusted to account for variations in seed flat and pot flat heights.

Figure 2:
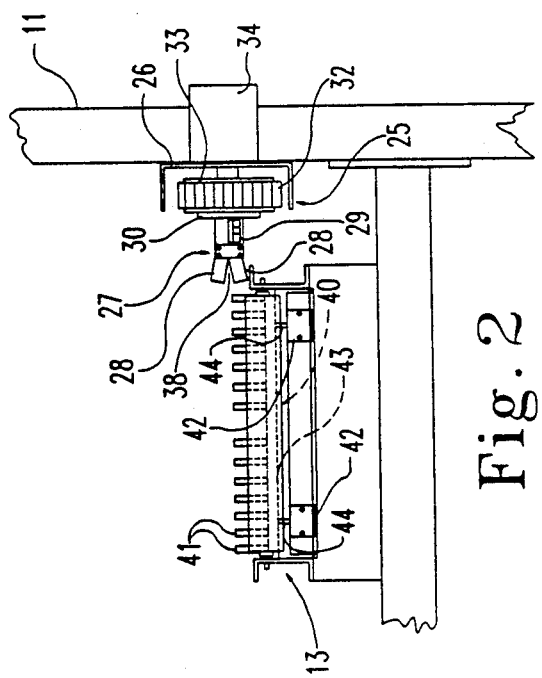
FIG. 2 is a partial end view of the apparatus of FIG. 1, in which only the seed flat conveyor and gripper mechanism are shown.

Each of the flats is moved by separate means for moving the flats supported by the conveyors. The seed flat is indexed by a moving means, such as indexing mechanism 25, which is associated with the seed conveyor 13, as shown more clearly in FIG. 2. The indexing mechanism 25 includes a support beam 26 which is mounted to the frame 11. A flat gripper assembly 27 includes oppsitely acting edge gripping fingers 28 which are adapted to grip the edge of the seed flat S. A gripper 29 controls the clamping operation to open and close the gripping fingers 28. The gripper 29 is affixed to a carriage 30 which is connected to a drive belt 32. The drive belt is drivenly engaged around a pulley 33, which is rotated by a drive motor 34. Another pulley, not shown, is situated at the opposite end of the support beam 26 (FIG. 1), so the belt spans between two pulleys over most of the length of the beam 26. The carriage, while being driven by the drive belt 32, is supported by a pair of guide rods, not shown, extending substantially along the length of the support beam 26.

As configured, rotation of the pulley 33 by the drive motor 34 causes the drive belt 32 to rotate, thereby translating the carriage 30 along the guide rods and indexing the flat gripper assembly 27. When the gripper 29 is actuated to grip the seed flat S, the seed flat can be indexed along the seed conveyor 13 in a direction parallel to its longitudinal axis. An articulated cable support 36 carries the electrical cable that supplies power and control signals to and from a computer controller 100. The cable support 36 keeps the electrical cables free from the drive belt 32 and provides full support for the cables as the indexing mechanism 25 translates.

Figure 3:
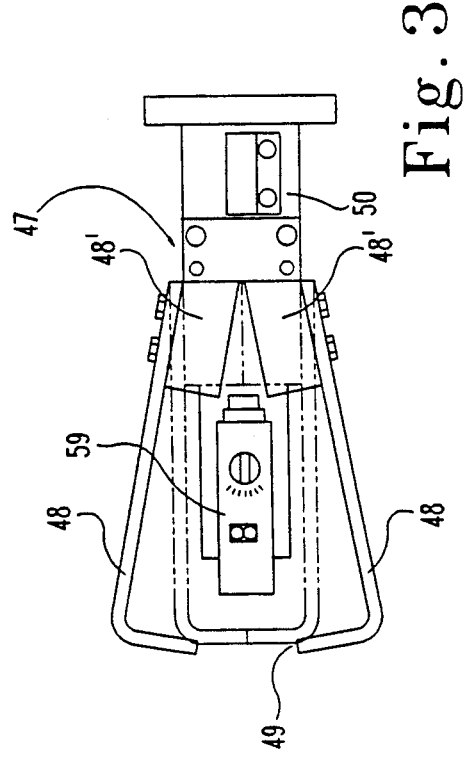
FIG. 3 is an enlarged detail view of the pot flat gripper mechanism shown in FIG. 1.

A similar mechanism is provided for indexing the pot flat. In particular, the moving means constitutes an indexing mechanism 45 which includes a support beam 46 which is mounted on a frame 11. A flat gripper assembly 47 includes rim gripping fingers 48, as shown more clearly in FIG. 3. The rim gripping fingers 48 in the preferred embodiment include a gripping pin 49 on the lower finger to grip under the rim of the pot flat P. The rim gripping fingers 48 are mounted to edge gripping fingers 48', which are identical to the edge gripping fingers 28 for the seed conveyor indexing mechanism.

An air actuated gripper 50 controls the opening and closing of the edge gripping fingers 48', which controls the operation of the rim gripping fingers 48. The motor 50 is mounted to a carriage 51 which is slidably mounted on carriage guide rods 52. The carriage guide rods 52 are mounted on the support beam 46. It is understood that the guide rods referred to in connection with the indexing mechanism 25 for the seed flat side of the apparatus are identical to the carriage guide rods 52, and are mounted on support beam 26.

Returning again to indexing mechanism 45, a drive belt 54 is mounted over a pulley 55 at one end of the support beam 46 and a drive pulley, not shown, at the opposite end of the beam. A drive motor 56 rotates the drive pulley 55 to cause the drive belt to translate, thereby indexing the carriage 51 and pot flat gripper assembly 47 with it. A cable support 58, similar to cable support 36, is mounted to the carriage 51 to the electrical cables to and from the computer controller 100 and the gripper 50. Among these electrical cables are cables fed an edge sensor 59. The edge sensor 59 is mounted to the carriage 51 so that it moves along with the pot flat gripper assembly. The edge sensor 59 is provided to sense the leading edge of the pot flat P as it rests on the conveyor 20. The edge sensor can be an optical sensor, such as Model No. E3S-D510E4 provided by Omron Corp. A similar edge sensor 38 (FIG. 2) is mounted to the carriage 30 of the indexing mechanism 25 for the seed flat gripper assembly 27.

In one specific embodiment, the drive motors 34 and 56 are stepping motors that are capable of step-wise rotational motion. Alternatively, the motors could be close looped servo motors or other similar motors capable of providing of indexed, or step-wise, motion. The grippers 29 and 50 can be of the type provided by Compact-Air Products as Model No. 112. The rim gripping fingers 48 can be formed of thin wall stainless steel so that there is some flexure of the gripping fingers to adequately grip the pot flat P.

Referring again to FIGS. 1 and 2, the seed flat conveyor 13 includes a seedling ejector 40 at approximately the midpoint of the conveyor, or more specifically at the seedling transfer station TS. The seedling ejector 40 includes a number of ejector pins 41 which are raised and lowered by way of a pair of ejector air cylinders 42. The pins 41 are preferably mounted on a bar 43 which is mounted on actuator rods 44 of the ejector motors 42. The cylinders 42 are supported by the support frame 11 directly beneath the conveyor 13. In one specific embodiment, the ejector motors 42 are pneumatic cylinders, such as Model No. BFHD3X12 sold by Compact Air Products.

The ejector pins 41 are situated to align with drain openings typically found in the base of the seed flat recesses. In their retracted position, the ejector pins permit the seed flat S to move over the ejector 40. When the ejector motors 42 are stroked, the ejector pins 41 move into the drain holes at the base of the seed flat S to push the seedling plug upward from the plug recess PR. Pushing the seedling plug upward facilitates gripping the seedling, as explained more fully herein.

The transfer apparatus 10 of the present invention also includes a seedling transfer mechanism 62 which is carried by an overhead gantry 60 attached to support frame 11. The seedling transfer mechanism 62 is mounted on a carriage 64 which is slidably supported on guide rods 65. The guide rods are mounted to the overhead gantry 60. A drive belt 67 is engaged around a drive pulley 68 and an idler pulley 69. The drive pulley 68 is connected to a motor 70, in a manner similar to the pulley and motor combinations for the indexing mechanisms 25 and 45. The drive belt 67 performs in the same manner to translate the carriage 64 along the overhead gantry 60. In this preferred embodiment, the overhead gantry 60 is fixed relative to the seed conveyor and pot conveyor. Thus, the gantry permits transverse motion of the seedling transfer mechanism 62 along one fixed axis, or transfer axis, which axis is preferably perpendicular to the longitudinal axes of the seed conveyor 13 and pot conveyor 20 and to the direction of indexed travel of the seed flat S and pot flat P.

Figure 5:
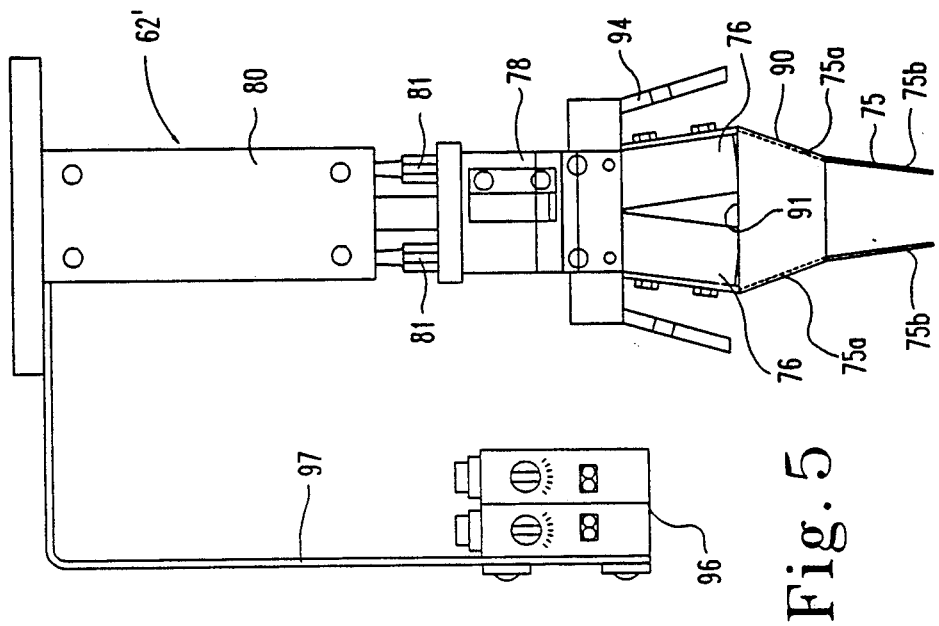
FIG. 5 is a front view of a plant transfer mechanism of another embodiment of the invention.
Figure 4:
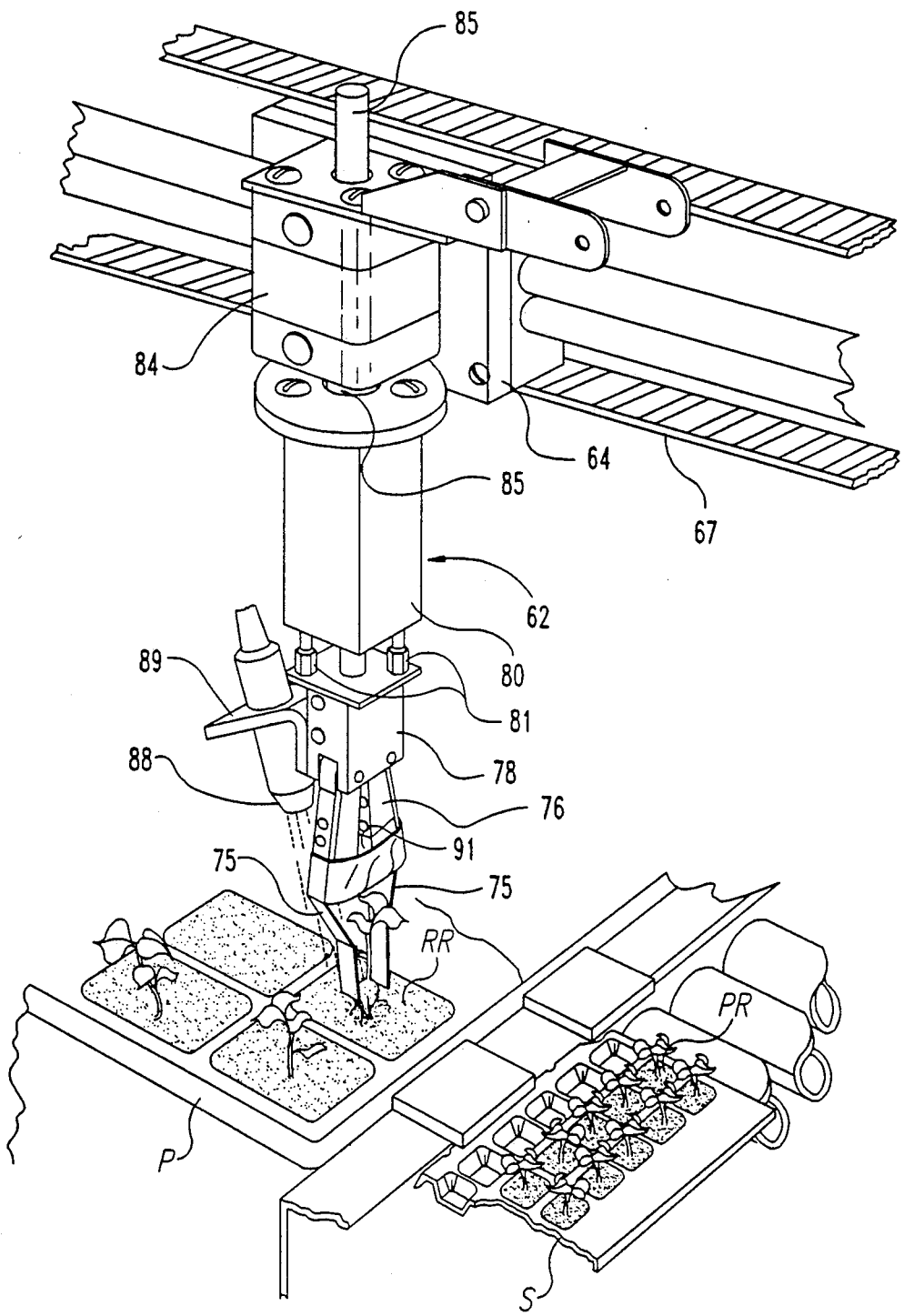
FIG. 4 is an enlarged orthographic view of the plant transfer mechanism of one embodiment of the invention shown in FIG. 1.

The seedling transfer mechanism 62 is shown in more detail in FIG. 4. In the one embodiment, a pair of opposite plant gripper fingers 75 are provided. These plant gripper fingers 75 are attached to edge gripper fingers 76, which are in turn controlled by a gripper air cylinder 78. The edge gripper fingers 76 and air cylinder 78 are identical to the fingers 28 and gripper 29 of the seed flat indexing mechanism 25. The plant gripper fingers 75 are formed of a spring steel to provide some resilience and flexibility while permitting adequate gripping force to grip the root ball of a seedling. The plant gripper fingers 75 are also stiff enough to be plunged into the soil in a seed flat plug recess PR. As shown in FIG. 5, the gripper fingers 75 are angled toward each other. Upper portions 75a of the fingers are wider apart than the lower gripping portions 75b in order to accommodate the flower of the seedling. Angling the lower gripping portions 75b inward can increase the resilient gripping force on the root ball of the seedling.

The gripper air cylinder 78 is affixed by extension rods 81 to an extension air cylinder 80, which provides means for extending and retracting the plant gripper fingers 75. When the extension rods 81 are extended, the plant gripper fingers 75 are plunged into the soil in the plug recess PR. The gripper air cylinder 78 is then actuated to draw the plant gripper fingers 75 together around the seedling. The extension air cylinder 80 is actuated to retract the extension rods 81, and thereby pull the plant gripper fingers and seedling out of the seed flat S.

In one embodiment of the seedling transfer mechanism 62, the extension air cylinder 80 is connected to a rotating output shaft 85 of a rotary motor 84. The rotary motor 84 is attached to and movable with the carriage 64. While the carriage limits translation of the seedling transfer mechanism 62 to a single transverse axis, the rotary motor 84 provides an additional degree of freedom the plant gripper fingers 75 can be rotated about a vertical axis. During the transfer process, in one embodiment of the present invention, rotation of the gripper fingers 75 facilitates the transfer motion.

In another embodiment of the invention, depicted in FIG. 5, a seedling transfer mechanism 62' has the extension air cylinder 80 affixed directly to the carriage 64, eliminating the rotary motor 84 and output shaft 85. All the remaining components of the mechanism 62' are identical to their counterpart components of mechanism 62. This embodiment can be accommodated by lowering the gantry 60, lengthening the extension rods 81, or adding a support bracket to the carriage 64 in order to support the seedling gripper fingers 75 in their optimum position above the seed flat plug recess PR. In this embodiment, the seedling gripper fingers are only capable of transverse movement along the single axis parallel to the guide rods 65. Thus, the transfer motion sequence of the seedling transfer mechanism 62' is modified from the motion when the rotary motor is employed.

An articulated cable support 86 can be provided to support the cables to and from the computer 100 and the gripper cylinder 78, extension air cylinder 80, and rotary motor 84 (when the rotary feature of transfer mechanism 62 is employed). The cable support is equally adapted to carry electrical wires as well as a pneumatic hose if, for instance, the extension motor is a pneumatic motor.

Referring again to FIG. 4, the seedling transfer mechanism 62 includes a liquid spray nozzle 88 attached to the gripper air cylinder 78 by a bracket 89. (A similar nozzle can be used with the non-rotary transfer mechanism 62' depicted in FIG. 5, although the jet 88 is hidden from view in that figure). A hose feeding the nozzle 88 can be carried by the cable support 86. The nozzle can provides a conical spray of water to the seedling as it is being extracted from the seed flat to assist in the removal of the root ball from the seed flat plug recess PR. A spray from the nozzle 88 can also assist in releasing the seedling from the gripper fingers 75 when the seedling has been transferred above a pot flat receiver recess RR. Water sprayed directed beneath the plant can soften the soil for ease of planting.

In addition, similar nozzles can be directed to dibble a hole in the soil to further facilitate planting the seedling. In the past, a separate machine has been provided to pre-dibble holes in the soil in each of the pot flat recesses. The present invention provides means, by way of the water nozzles, for eliminating the need to pre-dibble. Moreover, the hole dibbled by the water nozzles is always exactly located directly beneath the plant gripper fingers 75. Use of prior pre-dibbling methods permitted some dibbled holes to be offset from the location at which the seedling transfer mechanism 62 attempted to replant the seedling.

In another aspect of the seedling transfer mechanism 62, a pair of limit brackets 94 can be provided. The limit brackets 94 control the outward expansion of the seedling gripper fingers 75. While the gripper air cylinder 78 is preferably positively controlled so that the fingers cannot over-extend, in the event that the gripper cylinder 78 fails, some means are provided to keep the gripper fingers 75 from moving too far apart.

In another feature of the present invention, a flexible web 90 is mounted across the top portions 75a of the seedling gripper fingers 75. The web extends only part way around the gripper fingers to leave an open web pocket 91. The web 90 is used to gently bend the seedling stem and flower so that the seedling does not get hung up on the gripper fingers 75. In the transfer operation, the gripper fingers are preferably oriented so that the soil plug and/or seedling root ball are grabbed by the fingers slightly to one edge of the seedling gripper fingers 75 so that the plant stem and flower are disposed within the web pocket 91, and preferably contact the web 90. It has been found that the web 90 greatly improves the efficiency of the seedling transfer because the seedling does not get hung up on the gripper fingers when the fingers are inserted into the pot flat receiver recess RR to replant the seedling. The nozzle 88 can be configured to provide a conical spray so that some water is sprayed onto the web 90 to further facilitate removal of the seedling from the web pocket 91.

In the non-rotary seedling transfer mechanism 62', shown in FIG. 5, the web pocket 91 is permanently oriented to open toward the seed flat S. This fixed orientation of the web 90 requires certain accommodations in the move sequence for the non-rotary mechanism, as discussed herein. Nevertheless, the function of the web 90, to facilitate replanting of the seedling, is the same for the rotary and non-rotary versions of the seedling transfer mechanisms 62 and 62', respectively.

The invention also resides in specific features for determining the filled or empty status of the seed flat plug recesses PR and the pot flat receiver recesses RR. It is understood that optimally, every plug recess PR of the seed flat will contain a seedling. However, for a variety of reasons, a seedling will not be found in a plug recess PR. In the pot flat, each recess is filled with soil to receive a transplanted seedling. Referring to the pot flat recess as an receiver recess RR simply indicates that no seedling has been replanted into that pot flat recess. The present invention includes means for determining whether a plug recess PR contains a viable seedling and whether a transfer move to a pot flat receiver recess RR was successful.

In one embodiment of the invention, a "Machine Vision" system is used in which a camera 92 is mounted on the gantry 60 and situated above the pot flat conveyor 20. The camera, which can be outfitted with an infrared filter, takes a "picture" of the pot flat P, which is fed to the computer 100. The computer 100 employs known "frame-grabber" technology to digitize the picture and determine which of the pot flat recesses includes a replanted seedling and which do not. This information is then used to determine where the seedling transfer mechanism 62 will move to transfer a seedling from the seed flat to the next available pot flat receiver recess RR.

Alternatively, the camera can be oriented above the seed flat S to determine which, if any, of the seed flat plug recesses PR does not contain a seedling. If a plug recess PR is empty, the computer 100 can sense this condition and move the seed flat and seedling transfer mechanism accordingly to the next plug recess. In one configuration, the camera 92 is mounted on the carriage 64 for the seedling transfer mechanism 62. The computer 100 can then direct the camera 92 to take a picture of both the seed flat S and the pot flat P when the mechanism 62 moves between the two flats during a transfer operation. The computer processes the information concerning the status of the recesses in the two flats to determine the next sequence of indexes of the seed and pot flats and transverse moves of the seedling transfer mechanism.

In another orientation, the camera 92 is mounted on the overhead gantry 60 at a location overlooking the seed flat S. At this location, the camera 92 provides an image to be processed by the computer 100 to determine which of the plug recesses PR of the seed flat are empty or have an improperly oriented seedling. Software within the computer 100 can then direct the indexing of the seed flat and motion of the seedling transfer mechanism 62 to a proper plug recess PR.

Alternatively, as shown in FIG. 5, a pair of infrared (IR) sensors 96 can replace the camera 92. The sensors 96 can be mounted by way of a bracket 97 to the non-rotary seedling transfer mechanism 62', offset to one side of the plant gripper fingers 75. Preferably, the sensors 96 are offset by about the width of a pot flat recess, preferably downstream from the pot flat recess that is immediately beneath the plant gripper fingers 75 after a seedling has been transferred. As explained more fully herein, certain moves of the apparatus 10 after the seedling has been replanted orient the IR sensors 96 directly over the pot flat recess that had most recently received a transplanted seedling. In this orientation, the sensors 96 scan the recess, preferably up to six times, to determine whether that recess is empty or has a viable seedling therein. If the pot flat recess RR is empty, the computer modifies the transfer move sequence accordingly to cause the next transfer move to again attempt to fill the same pot flat recess.

The computer 100 operates as a system controller to coordinate the action of the seed flat indexing mechanism 25, pot flat indexing mechanism 45 and seedling transfer mechanism 62. More particularly, at the seed flat side of the transfer apparatus 10, the computer 100 sends signals to the seed flat gripper 29 to grip and release the seed flat, and to the seed flat pulley drive motor 34 to index the carriage 30 and edge gripping fingers 28. The computer also receives signals from the edge sensor 38. When a new seed flat is placed on the seed flat conveyor 13, the computer directs the drive motor 34 to translate the carriage 30, and consequently the edge sensor 38 mounted to the carriage, until the edge sensor detects the leading edge of the seed flat S. The computer then directs the indexing motion of the motor 34 to conduct a binary search for the proper location on the seed flat S to grip the flat. This proper location can be indicated by cutting a notch in the edge of the seed flat or by placing a sensing strip on the seed flat. When the edge sensor 38 detects this proper location, the computer actuates the gripper 29 to clamp the fingers 28 onto the edge of the seed flat. The gripper fingers 28 maintain their grip on the seed flat until all of the seed flat receiver recesses RR have been emptied.

At the pot flat side of the transfer apparatus 10, the computer 100 sends signals to the pot flat gripper 50 to grip and release the pot flat, and to the pot flat pulley drive motor 56 to index the carriage 51 and rim gripping fingers 48. The computer also receives signals from the edge sensor 59, which operates in the same manner as the pot flat edge sensor 38 to locate the proper gripping location on the pot flat P.

When the seed flat is situated at the transfer station TR (FIG. 1), the computer actuates the ejector motors or cylinders 42 that extend the ejector pins 41 of the seedling ejector 40. Once the seedling gripper fingers 75 have grabbed the seedling, the computer sends a signal to the ejector cylinders 42 to retract the ejector pins. Alternatively, the ejector pins 41 can remain in their extended position until all seedlings along a single transverse row of the seed flat S have been removed. Then, the computer 100 can direct the cylinders 42 to retract the pins to pull the pins out of the drain holes in the base of the seed flat, so that the seed flat S can be indexed to its next transverse row. However, prolonged extension of the ejector pins prolongs the exposure of the root ball of the seedlings not yet transferred. It is, therefore, believed to be preferable to extend and retract the ejector pins 41 with each seedling transfer. In this preferred embodiment, the extension air cylinder 80 and ejector air cylinders 42 are simultaneously actuated so that an ejector pin 41 pushes the subject seedling up as the seedling gripper fingers 75 are moving down around the seedling.

The computer 100 sends control signals to the rotary seedling transfer mechanism 62 or non-rotary mechanism 62', and particularly to the gripper air cylinder 78 to clamp and retract the seedling gripper fingers 75, to the extension air cylinder 80 to extend and retract the fingers from a flat recess, and to the pulley drive motor 70 to provide for transverse motion of the transfer mechanism 62. When the rotary transfer mechanism 62 is employed, the computer also sends control signals to the rotary motor 84 to rotate the gripper fingers 75. If a nozzle 88 is utilized, signals from the computer 100 control the on-off operation of the nozzle. The computer 100 receives signals either from the camera 92 or from the IR sensors 96, depending upon which technique is used to determine the state of the seed and pot flat recesses.

Figure 6:
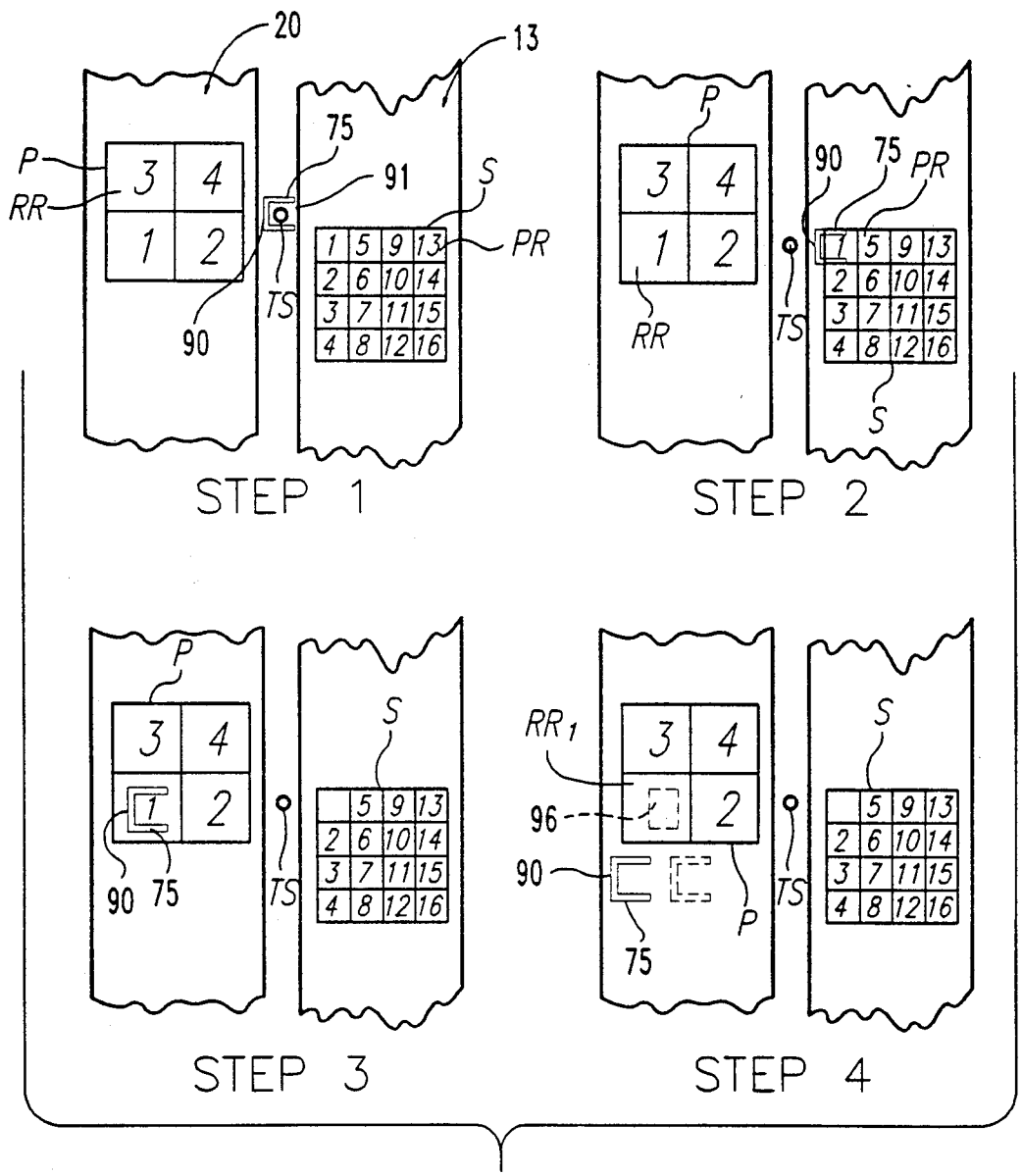
FIG. 6 is a schematic representation of transfer move sequences for the seedling transfer apparatus of one embodiment of the invention.
Figure 7:
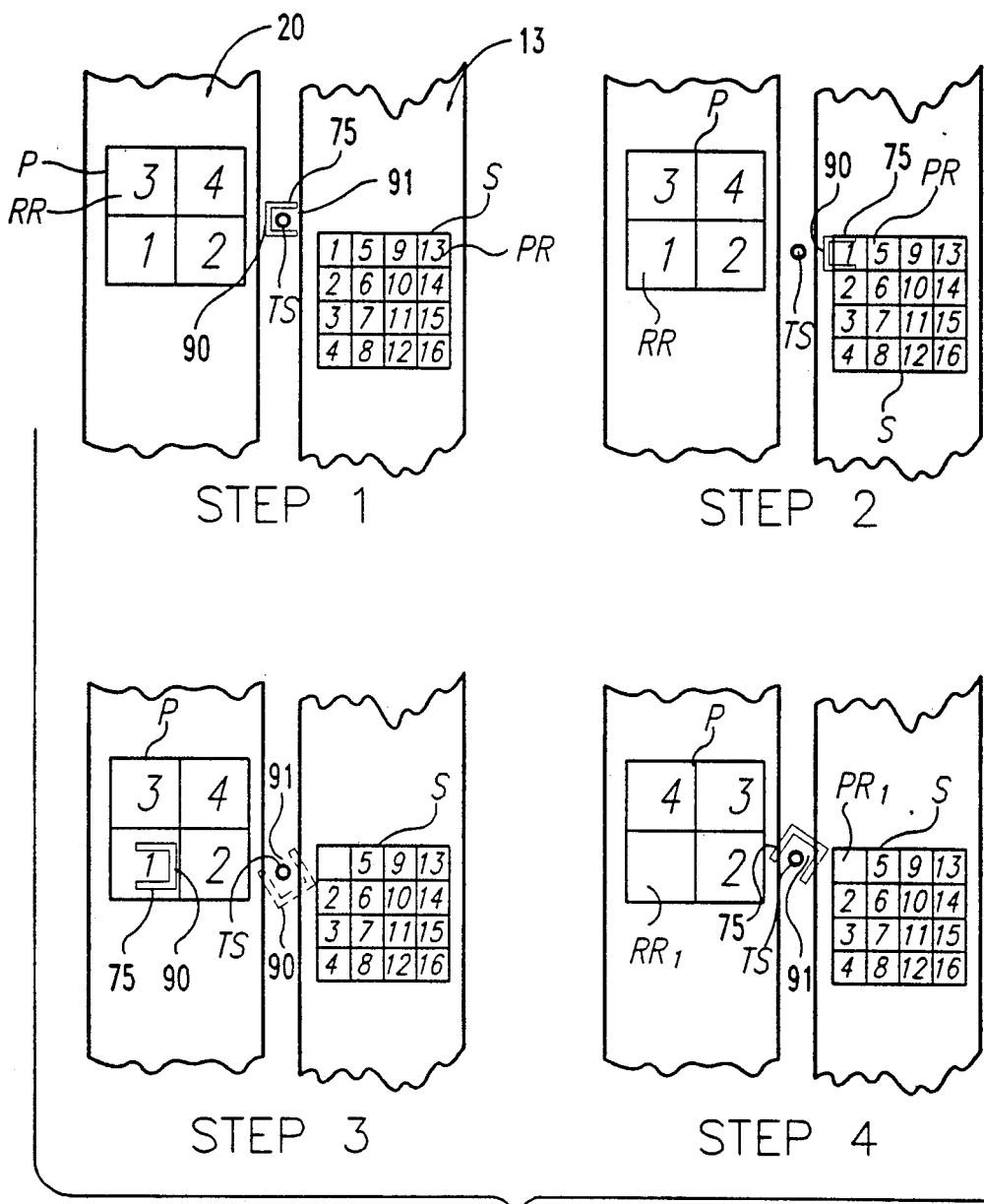
FIG. 7 is a schematic representation of transfer move sequences for a seedling transfer apparatus of another embodiment of the invention.

The computer 100 controls the sequence of movements of the seed flat, pot flat and seedling transfer mechanism in order to minimize the transfer time. The move sequences depends upon which of the rotary version of the seedling transfer mechanism 62 or the non-rotary version 62' is being used. FIG. 6 is a schematic representation of the move sequences for the non-rotary seedling transfer mechanism 62', while FIG. 7 shows the move sequences when the rotary mechanism 62 is being used. In these figures, the seed flat S is represented as having only four rows and four columns, while the pot flat P is shown with only two rows and two columns, for ease of explanation. It is understood, of course, that the move sequences described below can be implemented on seed and pot flats of various dimensions.

In both non-rotary and rotary move sequences, the seed and pot flats are indexed forward and backward along their respective conveyors until an appropriate recess in either flat is positioned in line with the transfer station TS. The seedling transfer mechanism, and particularly the seedling gripper fingers 75, moves over the transfer station transverse to the indexing direction of the seed and pot flats. In the preferred embodiment of both move sequences, the seedlings are removed from the seed flat S along a longitudinal column of the seed flat, and are replanted into the pot flat P along a transverse row. This move strategy minimizes the number of longitudinal indexes of the pot flat P, thereby reducing the trauma to the newly transferred and replanted seedlings already in the pot flat P.

Referring to FIG. 6, the seed flat plug recesses PR are numbered corresponding to the sequence in which the seedlings are removed from the recesses. The pot flat receiver recesses RR are also numbered, corresponding to the order in which the recesses are filled. It is understood that each of the pot flat receiver recesses RR contain soil into which the seedling is replanted. The soil in the recesses can be pre-dibbled, or the nozzle 88 can be used to dibble a hole in the soil prior to transplanting the seedling. For purposes of explaining the move sequence, it is initially assumed that each of the plug recesses PR in the seed flat S contain a viable seedling.

In Step 1 of the move sequence, the seed flat S and pot flat P are grabbed by their respective indexing mechanisms 45 and 25 and translated longitudinally along the conveyors 13 and 20, respectively, until the first recesses $PR_1$ and $RR_1$ are aligned with the transfer station TS. The plant gripper fingers 75 are oriented directly above the transfer station TS, with the web pocket 91 facing the seed flat S. With the seedling gripper fingers 75 retracted upward, the pulley drive motor 70 is actuated to move the seedling transfer mechanism 62' toward the seed flat S until the fingers 75 are directly above the first plug recess $PR_1$, as shown in Step 2. The computer 100 simultaneously commands the ejector 40 to stroke upward to dislodge the seedling in recess $PR_1$ and the extension air cylinder 78 to stroke downward to extend the fingers 75 around the seedling. As the fingers 75 extend down, the seedling enters the web pocket 91 and the web contacts the stem and flower of the seedling to bend the seedling slightly toward the seed flat S.

As the fingers 75 extend downward they penetrate the soil in the recess $PR_1$. When the fingers have been fully extended, the computer 100 directs the gripper air cylinder 78 to gently clamp the fingers 75 about the root ball of the seedling. The extension air cylinder 80 is then commanded to retract the fingers 75, so that the seedling is completely clear of the seed flat S. The computer 100 directs the pulley motor 70 to convey the seedling transfer mechanism 62' toward the pot flat until the fingers 75 are directly over the first pot flat receiver recess $RR_1$, shown in Step 3. In the preferred embodiment, the nozzle 88 is activated to dibble a hole in the soil in the recess $RR_1$. Once the hole has been dibble, the nozzle emits a water spray to facilitate removal of the seedling from the gripper fingers 75 and web 90. In sequence, the extension air cylinder 80 is directed to extend the fingers until the penetrate the dibbled hole, then the fingers 75 are moved apart by the gripper air cylinder 78 and retracted by the air cylinder 80.

In the next step of the move sequence, the fingers 75 are moved away from the recess $RR_1$ until the web 90 is clear of the seedling. The pulley motor 56 of the pot flat indexing mechanism 45 is energized to index the pot flat P away from the fingers 75, as shown at Step 4 in FIG. 6. The pulley motor 70 of the seedling transfer mechanism 62' is activated to index the fingers into longitudinal alignment with the previously filled recess $RR_1$. In this alignment, the IR sensors 96 are situated directly above the newly replanted seedling in recess $RR_1$. The sensors scan the recess and transmit a signal to computer 100, which processes the signal to determine whether or not the transfer was successful. If the IR sensors 96 fail to detect a seedling in the recess, the computer 100 "remembers" the recess $RR_1$ location and redirects the seedling transfer mechanism 62' to that location during the next transfer operation. If the IR sensors detect the presence of a seedling, the computer 100 increments to the next pot flat recess $RR_2$ to receive the next seedling.

At some time after the fingers 75 have been transversely moved to the pot flat in Step 3, the computer commands the seed flat pulley motor 34 to move the carriage 30 and edge gripping fingers 28 in order to index the seed flat to its next position. In this next position, shown in Step 4, the second plug recess $PR_2$ is aligned with the transfer station TS. The seed flat S is then properly positioned for the next transfer move sequence. Once the IR sensors 96 have examined the newly replanted seedling, the seedling transfer mechanism 62' is conveyed toward the seed flat and the pot flat is indexed back to the start position shown in FIG. 1. The transfer move sequence illustrated in FIG. 6 then repeats.

The computer 100 is provided with a memory to keep track of the number of longitudinal and transverse recesses in both the seed flat S and pot flat P. Software counters within the computer are incremented with each successful seedling transfer so the seedling transfer mechanism 62' can be directed to the proper plug recess $PR_m$ and pot flat receiver recess $RR_n$. When the software counters indicate the end of a column in the seed flat, the seed flat indexing mechanism 25 is directed to move the seed flat to align the first row of the flat with the transfer station TS. Likewise, when the software counters indicate that the last receiver recess in a particular pot flat row, such as recess $RR_2$ in FIG. 6, has been filled, the computer 100 directs the pot flat indexing mechanism 45 to index the pot flat to align the next adjacent row of the flat with the transfer station TR. This cycle continues until the computer counters indicate either that the last pot flat recess, such as $RR_4$ in FIG. 6, has been filled, or that seedling from the last seed flat recess, such as $PR_{16}$, has been transferred.

If the camera 92 is used, instead of the IR sensors, the digitized image produced by the computer 100 can be immediately processed to ascertain which of the seed flat plug recesses $PR_m$ are empty (i.e.—without a seedling) prior to initiating the move sequence. Software within the computer 100 can then compare the incremented recess counter for the seed flat with the predetermined receiver recesses in order to direct the indexing of the seed flat accordingly. In a similar manner, the camera 92 can be used to take a "picture" of the pot flat after every transfer move sequence, that is after Step 3 in FIG. 6, in order to ascertain the identity of the next available pot flat receiver recess $RR_n$.

Turning now to FIG. 7, the transfer move sequence for the rotary seedling transfer mechanism 62 (FIG. 4) is illustrated. The use of the rotary mechanism 62 permits elimination of the move steps required for the fingers 75 to clear the transplanted seedling. The first two steps of the move sequence for the rotary mechanism 62 are identical to the initial steps for the non-rotary mechanism 62'. However, in Step 3, the rotary motor 84 is actuated to rotate the fingers 75 through 180° until the web pocket 91 is facing toward the seed flat S. The seedling transfer mechanism 62 then continues its transverse motion until the fingers 75 are situated over the proper receiver recess $RR_1$, as shown at Step 3.

In the final step of the transfer move sequence, Step 4 in FIG. 7, the fingers 75 are transversely moved directly toward the seed flat and its next plug recess $PR_2$ (the seed flat having been previously indexed to its next position). During this transverse move, the rotary motor 84 is again energized to rotate the fingers through 180° until the web pocket 91 again opens toward the seed flat S. The seed flat S, pot flat P and seedling gripping fingers 75 of mechanism 62 are then oriented as shown at Step 2 in FIG. 7.

In both transfer move sequences of FIGS. 6 and 7, the net movements of the seed flat S and pot flat P are opposite. That is, the seed flat is indexed from plug recess to plug recess in one longitudinal direction on the seed flat conveyor, while the pot flat is indexed from one row to the next in the opposite longitudinal direction as the receiver recesses $RR_n$ are filled. The impact of these opposite net movements is that the seedling transfer mechanisms 62 and 62' need only translate along a single axis transverse to the flat longitudinal directions. This minimizes the move distance and move time for transferring a seedling from the seed flat to the pot flat.

Another feature of the present invention is that the transfer move sequences for either mechanism 62 or 62' is dynamic. The computer 100 receives information concerning the plug recesses $PR_m$ in the seed flat and receive recesses $RR_n$ in the pot flat that is used to determine when and where the flats must be indexed and the seedling transfer mechanism moved to find the next seedling and move it to the next available pot flat recess. This feature represents a significant improvement over prior art devices that are unable to avoid propagating errors in the seed flat over to the pot flat, or are unable to determine when a seedling has been lost in transit and not replanted in the pot flat. The sensors 96 or camera 92 provide means for detecting the condition of the flat recesses, which condition information is processed by the computer 100 to determine the optimum move strategy in milliseconds. Thus, the computer controlled seedling transfer apparatus 10 of the present invention optimizes transfer accuracy and seedling transfer rates for a significantly more efficient operation than provided by prior art devices.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, while the preferred embodiment of the invention described includes free-wheeling conveyors 13 and 20 and flat indexing mechanisms 25 and 45, the indexing mechanisms can be replaced by indexing conveyors using driven rollers or a driven belt. However, the indexing conveyors must be capable of precise high-speed movements in order to properly move the seed and pot flats.

It is also understood that while the present invention is described for use as a seedling transfer apparatus, the invention may be equally suited for other applications that require piece-wise transfers at high speed and high accuracy.

What is claimed is:

1. An apparatus for sequentially transferring plant seedlings from seed flats, each having a number of plug recesses initially containing a number of plant seedlings therein, to pot flats, each having a number of receiver recesses to be filled with seedlings, the apparatus comprising:

means for supporting the seed flats and the pot flats to permit movement of the flats;

transfer means for transferring a seedling from a plug recess in a seed flat to a receiver recess in a pot flat, said transfer means including;

plant gripper means for releasably gripping the seedling to remove the seedling from a plug recess of a seed flat and to release the seedling in a receiver recess of a pot flat wherein said plant gripper means includes:

a pair of resilient fingers;

means for moving said pair of fingers together and apart to grip and release a seedling; and a flexible web affixed between said resilient fingers defining a web pocket between said fingers and said web to contain a portion of the seedling therein; and means for moving the plant gripper means between a seed flat and a pot flat along a transfer axis while the plant gripper means is gripping the seedling; and flat moving means for moving a seed flat and a pot flat so that a next sequential plug recess in the seed flat is oriented along said transfer axis when the plant gripper means is at the seed flat, and a next sequential receiver recess in the pot flat is oriented along said transfer axis when the plant gripper means is at the pot flat.

2. The apparatus for sequentially transferring plant seedlings of claim 1, wherein said plant gripper means further includes means for rotating said pair of fingers to change the orientation of said web pocket.

3. An apparatus for sequentially transferring plant seedlings from seed flats, each having a number of plug recesses initially containing a number of plant seedlings therein, to pot flats, each having a number of receiver recesses to be filled with seedlings, the apparatus comprising:

means for supporting the seed flats and the pot flats to permit movement of the flats;

transfer means for transferring a seedling from a plug recess in a seed flat to a receiver recess in a pot flat, said transfer means including;

plant gripper means for releasably gripping the seedling to remove the seedling from a plug recess of a seed flat and to release the seedling in a receiver recess of a pot flat;

a liquid spray nozzle attached to the plant gripper means and directed to emit a liquid spray beneath the plant gripper means; and means for moving the plant gripper means between a seed flat and a pot flat along a transfer axis while the plant gripper means is gripping the seedling; and flat moving means for moving a seed flat and a pot flat so that a next sequential plug recess in the seed flat is oriented along said transfer axis when the plant gripper means is at the seed flat, and a next sequential receiver recess in the pot flat is oriented along said transfer axis when the plant gripper means is at the pot flat.

4. The apparatus for sequentially transferring plant seedlings of claim 3, in which the receiver recesses in the plug flat include soil within which the seedlings are to be replanted, wherein:

said nozzle is adapted to provide a jet spray at said next receiver recess when the plant gripper means is at the pot flat, said jet spray being sufficiently concentrated to dibble a hole in the soil contained within said next receiver recess for receipt of the seedling therein.

5. An apparatus for sequentially transferring objects from a first flat having a number of positions initially containing a number of objects, to a second flat having a number of receiver positions for receiving objects, the apparatus comprising:

first means for moving the first flat along a first axis;

second means for moving the second flat along a second axis;

gripper means for releasably gripping the object to remove the object from a position on the first flat located along a first directional axis and to release the object at a receiver position on the second flat located along a second directional axis, said second directional axis oriented perpendicular to said first axis;

gripper moving means for moving the gripper means between the first flat and the second flat along a transfer axis while the gripper means is gripping the object; and a computer controller for controlling the operation of said first means, said second means, said gripper means and said gripper moving means so that the gripper means removes objects sequentially from positions on the first flat and releases the objects onto sequential receiver positions on the second flat, said computer controller includes means implementing an algorithm to minimize the travel distance of the gripper moving means between sequential positions on the first and second flats, wherein said computer controller includes means for sensing whether an object is located on the next sequential position of the first flat and for moving the first flat so that said next sequential position is oriented along said transfer axis only when an object is sensed.

6. An apparatus for sequentially transferring objects from a first flat having a number of positions initially containing a number of objects, to a second flat having a number of receiver positions for receiving objects, the apparatus comprising:

first means for moving the first flat along a first axis;

second means for moving the second flat along a second axis;

gripper means for releasably gripping the object to remove the object from a position on the first flat located along a first directional axis and to release the object at a receiver position on the second flat located along a second directional axis, said second directional axis oriented perpendicular to said first axis;

gripper moving means for moving the gripper means between the first flat and the second flat along a transfer axis while the gripper means is gripping the object; and a computer controller for controlling the operation of said first means, said second means, said gripper means and said gripper moving means so that the gripper means removes objects sequentially from positions on the first flat and releases the objects onto sequential receiver positions on the second flat, said computer controller includes means implementing an algorithm to minimize the travel distance of the gripper moving means between sequential positions on the first and second flats, wherein said computer controller includes means for sensing whether an object has been released on the next sequential receiver position of the second flat and for moving the second flat so that a new sequential receiver position of the second flat and for moving the second flat so that a new sequential receiver position is oriented along said transfer axis only when an object is sensed.

7. The apparatus for sequentially transferring plant seedlings of claim 6 wherein said means for sensing includes a means for producing a digital image for determining whether an object has been released on the next sequential receiver position of the second flat.

8. An apparatus for sequentially transferring objects from a first flat having a number of positions initially containing a number of objects, to a second flat having a number of receiver positions for receiving objects, the apparatus comprising:

first means for moving the first flat along a first axis;

second means for moving the second flat along a second axis;

gripper means for releasably gripping the object to remove the object from a position on the first flat located along a first directional axis and to release the object at a receiver position on the second flat located along a second directional axis, said second directional axis oriented perpendicular to said first axis;

gripper moving means for moving the gripper means between the first flat and the second flat along a transfer axis while the gripper means is gripping the object; and a computer controller for controlling the operation of said first means, said second means, said gripper means and said gripper moving means so that the gripper means removes objects sequentially from positions on the first flat and releases the objects onto sequential receiver positions on the second flat, said computer controller includes means implementing an algorithm to minimize the travel distance of the gripper moving means between sequential positions on the first and second flats, wherein said computer controller includes:

means for sensing whether an object is located on each of the number of positions on the first flat; and means for implementing a second algorithm to control the movement of the gripper means to only those location on the first flat having an object located thereon.

9. The apparatus for sequentially transferring plant seedlings of claim 8 wherein said means for sensing includes a means for producing a digital image of those locations on the first flat having an object located thereon.

10. An apparatus for sequentially transferring plant seedlings from seed flats, each having a number of plug recesses along perpendicular first rows and columns initially containing a number of plant seedlings therein, to pot flats, each having a number of receiver recesses along perpendicular second rows and columns to be filled with seedlings, the apparatus comprising:

means for supporting the seed flats and the pot flats to permit movement of the flats;

flat moving means for moving a seed flat and a pot flat so that a next sequential plug recess in the seed flat is oriented along a transfer axis when the plant gripper means is at the seed flat, and a next sequential receiver recess in the pot flat is oriented along said transfer axis when the plant gripper means is at the pot flat, wherein said flat moving means includes:

first means for moving the seed flat along a first axis; and second means for moving the pot flat along a second axis; and said first and second axes are parallel and said transfer axis intersects both said first and second axes, and wherein either said first means for moving is configured to move a seed flat in opposite directions along said first axis or wherein said second means for moving is configured to move a pot flat in opposite directions along said second axis; and transfer means for transferring a seedling from a plug recess in a seed flat located along one of the first rows or columns of the seed flat to a receiver recess in a pot flat located along one of the second columns or rows of the pot flat, perpendicular to said one of the first rows or first columns of the seed flat, said transfer means including;

plant gripper means for releasably gripping the seedling to remove the seedling from a plug recess of a seed flat and to release the seedling in a receiver recess of a pot flat; and means for moving the plant gripper means between a seed flat and a pot flat along said transfer axis while the plant gripper means is gripping the seedling.

* * * * *

UNITED STATES PATENT AND TRADEMARK OFFICE
CERTIFICATE OF CORRECTION

PATENT NO. : 5,247,761

DATED : September 28, 1993

INVENTOR(S) : Gaines E. Miles and Stephen M. Beam

It is certified that error appears in the above-identified patent and that said Letters Patent is hereby corrected as shown below:

Column 5, line 14 change "BFHD3X12" to --BFHD34X12--
Column 10, line 53 change "dibble" to --dibbled--
Column 12, line 31 change "receive" to --receiver--

Signed and Sealed this

Fifth Day of April, 1994

Attest:

BRUCE LEHMAN

Attesting Officer

Commissioner of Patents and Trademarks